(12) United States Patent
Kwa et al.

(10) Patent No.: US 7,752,473 B1
(45) Date of Patent: Jul. 6, 2010

(54) PROVIDING A DETERMINISTIC IDLE TIME WINDOW FOR AN IDLE STATE OF A DEVICE

(75) Inventors: Seh W. Kwa, San Jose, CA (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 937 days.

(21) Appl. No.: 11/384,681

(22) Filed: Mar. 20, 2006

(51) Int. Cl.
G06F 1/00 (2006.01)
(52) U.S. Cl. ................................ 713/323; 713/320
(58) Field of Classification Search ............. 713/320, 713/323
See application file for complete search history.

(56) References Cited

U.S. PATENT DOCUMENTS

| | | | | |
|---|---|---|---|---|
| 5,802,305 A * | 9/1998 | McKaughan et al. | ........ | 709/227 |
| 5,838,991 A * | 11/1998 | Shipman | ........ | 710/18 |
| 6,009,488 A | 12/1999 | Kavipurapu | ........ | 710/105 |
| 6,192,230 B1 * | 2/2001 | van Bokhorst et al. | ... | 455/343.3 |
| 6,622,251 B1 * | 9/2003 | Lindskog et al. | ........ | 713/300 |
| 6,804,542 B1 * | 10/2004 | Haartsen | ........ | 455/574 |
| 6,990,666 B2 * | 1/2006 | Hirschfeld et al. | ........ | 718/104 |
| 7,130,668 B2 * | 10/2006 | Chang et al. | ........ | 455/574 |
| 7,237,131 B2 * | 6/2007 | Kwa et al. | ........ | 713/323 |
| 7,386,745 B2 * | 6/2008 | Cromer et al. | ........ | 713/323 |
| 7,430,421 B2 * | 9/2008 | Park | ........ | 455/456.1 |
| 2005/0149768 A1 | 7/2005 | Kwa et al. | ........ | 713/300 |
| 2005/0221869 A1 * | 10/2005 | Liu et al. | ........ | 455/574 |
| 2006/0294179 A1 * | 12/2006 | Kwa et al. | ........ | 709/200 |
| 2007/0005997 A1 * | 1/2007 | Kardach et al. | ........ | 713/300 |

OTHER PUBLICATIONS

U.S. Appl. No. 11/166,646, filed Jun. 23, 2005, entitled "A Method and System for Deterministic Throttling for Thermal Management" by Seh W. Kwa, Animesh Mishra, and Naveen Cherukuri.
U.S. Appl. No. 11/173,784, filed Jun. 30, 2005, entitled "Various Methods and Apparatuses for Power States in a Controller" by Jim Kardach, Barnes Cooper, Seh Kwa, Animesh Mishra, and Paul Diefenbaugh.
U.S. Appl. No. 11/773,220, filed Jun. 30, 2005, entitled "Power Management System for Computing Platform" by Jim Kardach, Barnes Cooper, Paul Deifenbaugh, Seh Kwa, Animesh Mishra.
Intel® Technology Journal—vol. 9, Issue 01, "The Emergence of PCI Express in the Next Generation of Mobile Platforms," Feb. 17, 2005, pp. 21-34.

* cited by examiner

*Primary Examiner*—Chun Cao
(74) *Attorney, Agent, or Firm*—Trop, Pruner & Hu, P.C.

(57) ABSTRACT

In one embodiment, the present invention includes a method for receiving at a target device a request for a deterministic idle window from an initiator device via an interconnect, determining whether to accept the request, e.g., based on an anticipated time until the target device's next activity, and sending an acknowledgment to the initiator device based on the determination. The initiator and target devices may enter an extended idle state based on the determination. Other embodiments are described and claimed.

26 Claims, 3 Drawing Sheets

PROVIDING A DETERMINISTIC IDLE TIME WINDOW FOR AN IDLE STATE OF A DEVICE

BACKGROUND

Embodiments of the present invention relate to power management for devices coupled via an interconnect, and more particularly to power management via entry and control of an idle period.

High performance serial-based interconnect or link technologies such as Peripheral Component Interconnect (PCI) Express™ (PCIe™) links based on the PCI Express™ Specification Base Specification version 1.1 (published Mar. 28, 2005) (hereafter the PCIe™ Specification) are being adopted in greater numbers of systems. PCIe™ links are point-to-point serial interconnects with N differential pairs intended for data transmission with either sideband clock forwarding or an embedded clock provided in each direction. Clock synchronization and data recovery requirements significantly influence the exit latencies of low power state exit and thus impact the effective use of low power states if the serial link always has to be armed for asynchronous bus master traffic. For example, a phase-locked loop (PLL) and a platform reference clock remain energized in the ready state even in the absence of traffic activities. This has a direct and negative consequence on the average power consumption of both upstream (i.e., platform-based) device and downstream (i.e., peripherally-attached) device coupled to the link. As an example, the upstream device may be a chipset component of the platform, while the downstream device may be a wireless adapter.

In the PCIe™ Specification, various power saving states are provided for a link (i.e., an interface) of a serial interconnect. Specifically, the specification describes the presence of link states L0, L0$_s$, L1, L2 and L3. The L0 state corresponds to link on and the L2 and L3 states correspond to link off (with the difference being that auxiliary power is present in the L2 state), while the L0$_s$ state provides for a low-resume standby latency state, and the L1 state corresponds to a low power standby state. These low power states may be achieved via the Active Status Power Management (ASPM) capability of a PCIe™ interface, which enables an endpoint device to request entry into a low power state. Per ASPM, the endpoint device is the only device permitted to request entry into the low power state, as the endpoint device has an understanding of the activities that it performs.

However, this rationale is not applicable to all devices coupled via a serial link such as a PCIe™ link. Furthermore, entry into a low power state does not provide any indication of an amount of time in which the state will be maintained. Accordingly, platform resources to which an endpoint device is coupled, e.g., a chipset and other such components oftentimes perform no power management as they are unaware of the length of the low power state. Furthermore, existing power management capabilities tend to ready the link for asynchronously-initiated traffic and thus provide limited power management opportunities. Accordingly, present mechanisms do not provide flexibility in entering and exiting low power states of devices coupled by links such as serial interconnects, nor do these states provide for aggressive power management of either endpoint devices or a platform to which such devices are coupled.

DETAILED DESCRIPTION

Figure 1:
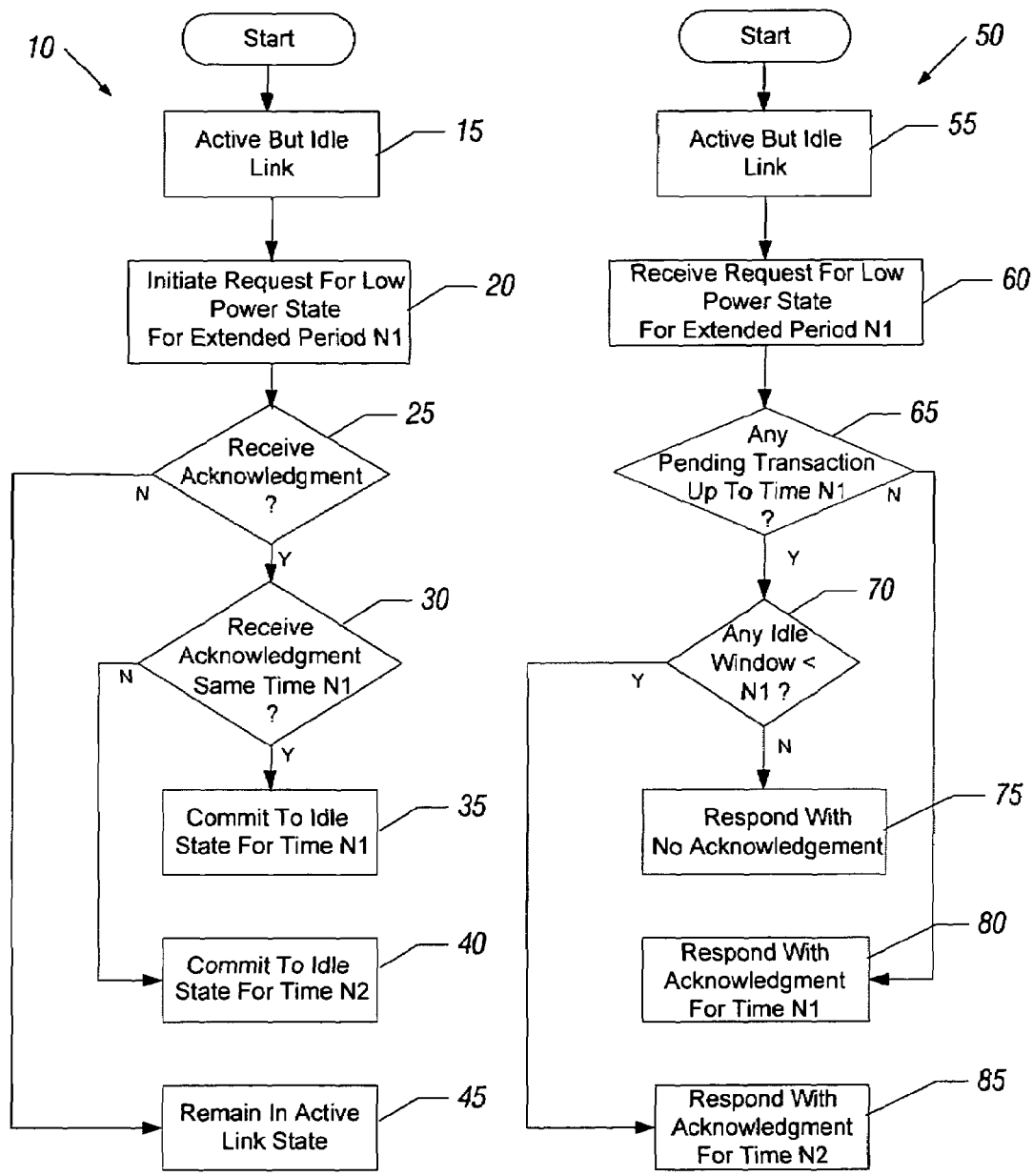
FIG. 1 is a flow diagram of a method in accordance with one embodiment of the present invention.

In various embodiments, devices coupled via an interconnect, e.g., a PCIe™ interconnect, may negotiate for extended idle time windows when the link between the devices is not being used (i.e., is not active). An extended idle time window in accordance with an embodiment of the present invention may be a deterministic time window. That is, a requesting device may send a request for entry into a low power state for a known time period. In this way, more aggressive power management opportunities may be leveraged both in the requesting device and in the platform, as the platform as a whole may become aware of a deterministic window of inactivity. Accordingly, greater power management actions, e.g., shutting down of various platform clocks, phase-locked loops (PLLs), oscillators and the like may be implemented. In the context of a PCIe™ interconnect mechanism, this deterministic time window and the associated low power state may be referred to herein as $L1_N$, denoting a low power state substantially equivalent to link state L1 of the PCIe™ Specification. However, this $L1_N$ state may be for an extended time period and also may be set for a known (i.e., deterministic) time period. Furthermore, even if a target device (i.e., a device receiving a request from a requesting device) cannot enter the low power state for the requested deterministic time, a negotiation may occur in which the target device may determine that it can enter the low power state for at least a portion of the time. In this way, a smaller deterministic window may be established such that the interfaces of both devices may enter this low power state.

Thus either device on a link can initiate a $L1_N$ request in accordance with an embodiment of the present invention as a function of its extended idle conditions such as known idle periods available in a network protocol. The initiating device may submit a message-based request to the target device connected to it through the serial link with an extended and deterministic time window. The target device may either reject or accept such request. To minimize negotiation overhead, an acknowledgement accepting the request can carry an indication of a different time window to remain in the $L1_N$ state. This determinism affords the devices awareness to enable more aggressive power management, such as shutdown of input/output (I/O) circuitry and PLL, as well as performing power gating and power management of platform reference clocks.

Still further, in accordance with various embodiments requests for entry into a low power state may be initiated by upstream devices as well as downstream devices. That is, a platform device to which a peripherally-attached device or other integrated device is coupled may initiate a request for a deterministic idle time window. As an example, a chipset component such as an I/O controller hub (ICH) may initiate the request to a downstream device, such as a peripherally-attached or integrated device, such as a wireless device. In some embodiments, these requests from the platform-based device may be initiated based on a priori knowledge of system health or other operating parameters. For example, an ICH may send requests for deterministic idle windows when a determination has been made that a mobile platform has reached a critical battery state. Other operating parameters may correspond to a thermal event, an imminent power loss event or other such system operating parameters.

Referring now to FIG. 1, shown is a flow diagram of a method in accordance with one embodiment of the present invention. More particularly, FIG. 1 shows actions occurring both at an initiating device (i.e., method 10) and a target device that receives a request (i.e., method 50). As shown in FIG. 1, method 10 may be used by an initiating device to request a deterministic idle time window for a link, e.g., a serial link between the requesting device and the target device. Note while described in this embodiment as a serial link, it is to be understood that the scope of the present invention is not so limited, and in various embodiments an interconnect coupling devices may also be parallel, optical or wireless. Accordingly, method 10 may begin by determining at the requesting device that the link is active but idle (block 15). Such a determination may be made when an interface of the requesting device (coupled to the link) has not received any data packets nor is preparing to send any data. When it is determined that the link is idle, the initiating device may initiate a request for a low power state for an extended period (block 20). The extended period may correspond to a time N1, which may be an extended time period such that aggressive power management techniques may be implemented. These aggressive power management technologies may be performed, as the time periods to enter and exit these power management states may be less than the extended time period. Thus the initiating device may transmit the request along the interconnect to the target device at block 20.

Next it may be determined whether an acknowledgment has been received from the target device (diamond 25). Note that in various embodiments, the acknowledgment may be explicit or implicit. If no acknowledgment is received, the links of the devices remain in their active link state (block 45). The target device may choose not to acknowledge a request for an extended idle period for various reasons, inducing the presence of data to be transmitted, other upcoming tasks to be performed, as a result of failure or otherwise.

Still referring to FIG. 1, if instead at diamond 25 an acknowledgment is received, control passes to diamond 30. There it may be determined whether the acknowledgement was for the same time period requested, i.e., N1 (diamond 30). If so, the initiating device may commit to an idle state for time N1 (block 35). Accordingly, various activities to enter into the low power state are performed to enable the interface of the requesting device to enter into the low power state. If instead it is determined at diamond 30 that the acknowledgment is for a different time period, control passes to block 40. There, the idle state may be committed to for this different time period, N2, which may correspond to a shorter time period than originally requested. A target device may send an acknowledgement in connection with a negotiation for a smaller time period, as the target device may be obligated to perform a task at some point within the original extended idle time window N1. However, the target device is able to enter a low power state for a shorter time period, e.g., N2. Accordingly, the link and the attached device (e.g., at least the interfaces thereof) may enter into low power status for this shorter deterministic window.

Still referring to FIG. 1, method 50 may be performed in parallel with method 10. More specifically, method 50 may be implemented by the target device to receive and process incoming requests for a deterministic idle time window. As shown in FIG. 1, method 50 may begin with the target device in an active but idle state with respect to its interface to the link between the devices (block 55). Next, the target device may receive the request for the low power state (i.e., for time N1) from the initiating device (block 60).

The target device then may determine whether it has any pending transactions that are to be performed before the expiration of this time window N1 (diamond 65). That is, the target device may determine whether it currently has any pending transactions or whether any previously scheduled transactions are to be performed before the deterministic idle time window concludes. If no such transactions exist, control passes to block 80. There, the target device may respond with an acknowledgement for the time window N1 (block 80). Accordingly, the interface of the target device (and the initiating device) may prepare for entry into the low power state. Note that with respect to both initiating and target devices, the low power state may be entered into by more than just the interface, in some embodiments.

Still referring to FIG. 1, if instead at diamond 65 it is determined that one or more transactions are to occur before the end of the deterministic time period, control passes to diamond 70. There, it may be determined whether the target device has any idle period that is less than the time window N1 (diamond 70). This determination may take various forms. For example, it may be determined what time period is available before a transaction or another activity is to be performed. If it is determined that such a time period exists, control may pass to block 85. Note that in some embodiments, the determination at diamond 70 may further determine whether this shorter time period is at least greater than a threshold. The threshold may correspond to a predetermined time for various devices (e.g., the interfaces of the target and/or initiating devices) to enter into and exit from a low power state. In other implementations the threshold may correspond to a greater time for additional devices or platform components, which may permit aggressive power management techniques, to enter into and exit a low power state. At block 85, the target device may respond with an acknowledgment for a different extended time period N2. Accordingly, the target device may prepare its interface for entry into the low power state.

Still referring to FIG. 1, if instead at diamond 70 it is determined that the target device has no idle window less than N1, control passes to diamond 75. There the target device may respond with a no acknowledgment (NAK) message (block 75). Accordingly, neither the target device nor the initiating device will enter into the low power state. While described with this particular implementation in the embodiment of FIG. 1, it is to be understood that the scope of the present invention is not so limited and in various embodiments different manners of negotiating for a deterministic idle time window may be realized.

Figure 2:
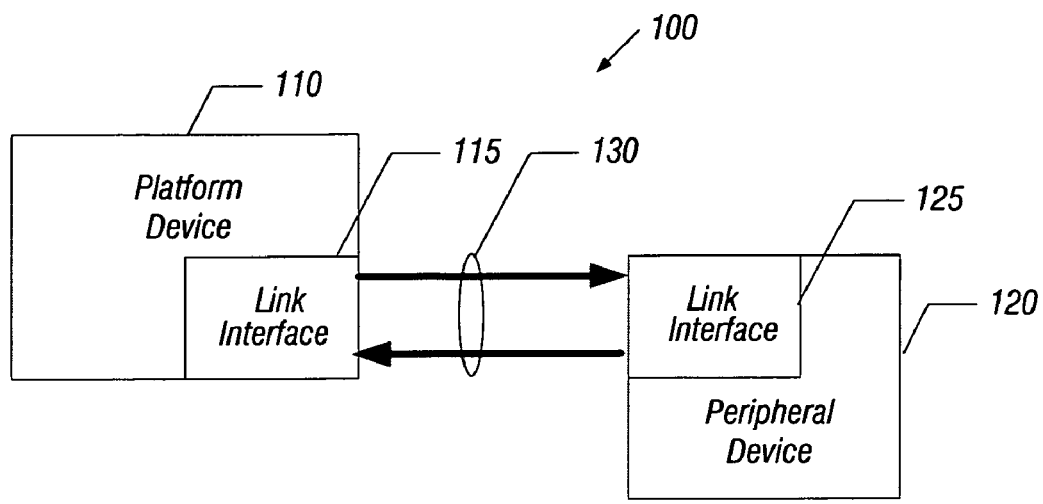
FIG. 2 is a block diagram of devices coupled via a serial-based interconnect in accordance with an embodiment of the present invention.

Referring now to FIG. 2, shown is a block diagram of devices coupled via a serial-based interconnect in accordance with an embodiment of the present invention. As shown in FIG. 2, system 100 includes a platform device 110 that is coupled to a peripheral device 120 via an interconnect 130 which may be formed of a serial link in either direction. In the embodiment of FIG. 2, platform device 110 may be, for example, a chipset of system 100, such as an ICH, although the scope of the present invention is not so limited. Platform device 110 may include a link interface 115 which may provide interface functions with respect to interconnect 130 and which may be a PCIe™ interface in some embodiments. In other embodiments, a derivative of a PCIe™ interface may be present.

In the embodiment of FIG. 2, peripheral device 120 may correspond to a specialized-function device, such as a wireless interface, e.g., a wireless adapter in accordance with a given wireless protocol such as the Institute of Electrical and Electronics Engineers (IEEE) std. 802.11g (published June 2003). As shown, peripheral device 120 may further include a link interface 125 to provide interface functions with respect to interconnect 130. In one embodiment, interconnect 130 may be a PCIe™ link although the scope of the present invention is not so limited. For example, in other implementations, interconnect 130 may correspond to a universal serial bus (USB) link in accordance with the USB Specification Rev. 2.0 (published December 2000), or another serial-based interconnect. Note that in the embodiment of FIG. 2, platform device 110 may correspond to an upstream device, while peripheral device 120 may correspond to a downstream device with respect to their presence in system 100.

Figure 3:
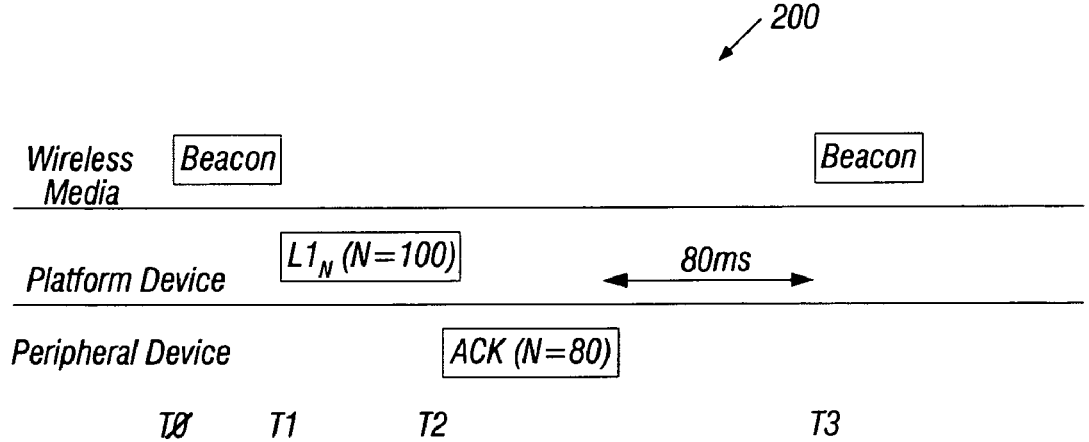
FIG. 3 is a timing diagram for a deterministic time window negotiation in accordance with one embodiment of the present invention.

In various embodiments, either of devices 110 and 120 may initiate a request for a deterministic time window. Referring now to FIG. 3, shown is a timing diagram for a deterministic time window negotiation in accordance with one embodiment of the present invention. As shown in FIG. 3, a timing diagram 200 illustrates that to implement a wireless medium, peripheral device 120 may snoop beacons at a predetermined time interval. Two such beacons are shown in timing diagram 200 occurring at times T0 and T3.

Still referring to FIG. 3, at a time T1, platform device 110 may issue a request for a deterministic, extended time window via a $L1_N$ request. In some embodiments, platform device 110 may initiate this request when recognizing that peripheral device 120 may be in extended idle state, e.g., due to lack of traffic activity. Note that this request may be for a time period N=100 milliseconds (ms). Note that this time period is for example only and deterministic time windows may be for greater or shorter times in various embodiments. Upon receipt of this request, peripheral device 120 may determine whether it has sufficient time before a next transaction to accommodate this request. Because peripheral device 120 must snoop for a beacon at a predetermined time interval (and more specifically at a time T3) that is less than the requested deterministic time window, peripheral device 120 may send an acknowledgement for a smaller time window, namely 80 milliseconds (for example). Accordingly, at time T2, peripheral device 120 sends an acknowledgement for this shorter time window. Thus based on the request and resulting negotiation, link interfaces 115 and 125 of the devices may enter into a low power state, such as an $L1_N$ state in accordance with an embodiment of the present invention for this shorter deterministic time window.

The determination of the period of $L1_N$ residency for the initiating device may be defined by the complete reception of the acknowledgement by the initiating device. The determination of $L1_N$ residency for the target device may be defined by the complete transmission of the acknowledgement by the target device. In some implementations, the flight time by the target device may be accounted for, although this flight time may be an insignificant portion of the desired extended time window of $L1_N$ residency.

As described herein, in one embodiment, a PCIe™-type link may couple devices together. In such an embodiment, the $L1_N$ request and acknowledgment (ACK)/no acknowledgement (NAK) messages may be conveyed between two devices using the following messages:

L1n_Request (data link layer packet (DLLP))
L1n_Ack (DLLP)
L1n_Nak (transaction layer packet (TLP))
L1n_Request_Closed (TLP)

The formats for these packets are shown in the following Tables.

TABLE 1

| | +0 | +1 | +2 | +3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| Byte 0 > | 0011 000 - Vendor Specific | Reserved - 00h | Requested L1n Time | 0001 0000 |
| Byte 4 > | 16b CRC | | | |

Referring now to Table 1, shown is a vendor-defined DLLP for a request for a deterministic idle time window in accordance with one embodiment of the present invention. As shown in Table 1, this DLLP may include various information, including a vendor-specific portion to indicate a vendor message, a requested time period of the time window, a predetermined code to indicate the specific message (e.g., request for an $L1_N$ state) and a checksum value, such as a 16-bit cyclic redundancy checksum (CRC). While described with this particular implementation in the embodiment of Table 1, it is to be understood that the scope of the present invention is not limited in this regard. For example, the portions may be arranged or sized differently, and may include different identifiers, additional information and the like.

TABLE 2

| | +0 | +1 | +2 | +3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| Byte 0 > | 0011 000 - Vendor Specific | Reserved - 00h | Granted L1n Time | 0001 0001 |
| Byte 4 > | 16b CRC | | | |

Similarly, Table 2, shown above provides a format for an acknowledgement message in accordance with an embodiment of the present invention. As shown in Table 2, this message may include vendor-specific information, as well as a time period for a granted idle time window (which may be the same as the requested time window or a shorter time window), as well as a predetermined code and a checksum value. Of course other implementations are possible.

TABLE 3

| | +0 | +1 | +2 | | | | +3 |
|---|---|---|---|---|---|---|---|
| | 7 6 5 4 3 2 1 0 | 7 6 5 4 3 2 1 0 | 7 6 5 4 3 2 1 0 | | | | 7 6 5 4 3 2 1 0 |
| Byte 0 > | R Fmt Type<br>0 1 1 0100 | R TC R | T E<br>D P | Attr<br>0 0 | R | | Length<br>000h |
| Byte 4 > | Requester ID | | Tag | | | | Message Code-<br>0111 1110 |
| Byte 8 > | Reserved | | Vendor ID<br>8086h (Intel Corporation) | | | | |
| Byte 12 > | Reserved | | | | | | V Msg:<br>0011 1110 |

Referring now to Table 3, shown is a NAK message in a vendor-defined message that may be issued by a target device when it chooses not to accept a $L1_N$ request. As shown in Table 3, this TLP may include various header codes including message types, length, requestor information consistent with a transaction layer packet, as well as a vendor identifier (D). Furthermore, the message may include message information that rejects the request for extended time window (i.e., byte 15). Note that the message may be sent using local routing (i.e., terminate at receiver) based on the message header.

TABLE 4

| | +0 | +1 | +2 | | | | +3 |
|---|---|---|---|---|---|---|---|
| | 7 6 5 4 3 2 1 0 | 7 6 5 4 3 2 1 0 | 7 6 5 4 3 2 1 0 | | | | 7 6 5 4 3 2 1 0 |
| Byte 0 > | R Fmt Type<br>0 1 1 0100 | R TC R | T E<br>D P | Attr<br>0 0 | R | | Length<br>000h |
| Byte 4 > | Requester ID | | Tag | | | | Message Code-<br>0111 1110 |
| Byte 8 > | Reserved | | Vendor ID<br>8086h (Intel Corporation) | | | | |
| Byte 12 > | Reserved | | | | | | V Msg:<br>0011 1111 |

Similarly, Table 4 shows a vendor-defined message for a close request in accordance with an embodiment of the present invention. As shown in Table 4, various transaction layer header information may be sent, along with a message code to indicate the request is closed (i.e., byte 15). Of course, the message formats shown in Tables 1-4 are for example only, and different formats may be present in other embodiments.

Note that conditions which cause a component to initiate a $L1_N$ request, and which cause the other component on the link to either accept or reject the $L1_N$ request may be implementation specific. However, the following guidelines may be used, in some embodiments. For example, for entry into a $L1_N$ state when the anticipated time to next link activity exceeds the amount of time required to enter and exit the inactive state under typical conditions, the component should initiate entry into $L1_N$. Thus when a request for entry into the $L1_N$ state is received, it may be accepted when the anticipated time to next link activity exceeds the amount of time required to enter and exit $L1_N$ under typical conditions.

In various embodiments, certain rules may dictate negotiation activity. For example, a component may be permitted to initiate $L1_N$ regardless of its flow control state. As one option, the component may block entry until it accumulates at least the minimum number of credits required to send the largest possible packet for any flow control (FC) type. As a second option, the component may be permitted to request entry into $L1_N$ without minimum credits, however an $L1_N$ exit should be requested upon needing to transmit on the link regardless of credit state.

Upon deciding to enter an $L1_N$ state, the $L1_N$ initiator may block movement of all TLPs from the transaction layer to the data link layer for transmission (including completions). If any TLPs become available from the transaction layer for transmission during the $L1_N$ negotiation process, the transition to $L1_N$ must first be completed and then the target component can initiate a return to L0 state. The $L1_N$ initiator may wait, continuing to follow the TLP data integrity protocol, until it receives a link layer acknowledgement for the last TLP it had previously sent (i.e., a retry buffer is empty).

The $L1_N$ initiator then transmits a stream of L1n_Request DLLPs. The $L1_N$ initiator may send this DLLP repeatedly with no more than 4 symbol times of idle between subsequent transmissions of the L1n_Request DLLP. The transmission of other DLLPs and ordered sets may occur at any time between L1n_Request transmissions, and do not contribute to the 4 symbol time idle limit. The $L1_N$ initiator may continue to transmit the L1n_Request DLLP until it receives a response from the other component on the link. The $L1_N$ initiator may thus remain in this loop waiting for a response from the $L1_N$ target.

During this waiting period, the $L1_N$ initiator may not transmit TLPs. Instead, it accepts TLPs and DLLPs from the $L1_N$ target, storing for later transmission any TLP responses required. It continues to respond with DLLPs, including FC update DLLPs, as needed by the data link layer protocol. If the $L1_N$ initiator for any reason needs to transmit a TLP on the link, a transition to the $L1_N$ state may be completed (through acceptance or rejection). If the $L1_N$ state is reached, the $L1_N$ initiator then can initiate an exit of $L1_N$ to handle the transfer.

In various embodiments, the $L1_N$ target may schedule a response within 100 nanoseconds (ns) of the first received L1n_Request DLLP to either accept or reject the request. In the case of a rejection, the $L1_N$ target may transmit an L1n_Nak Message to the $L1_N$ initiator. Once the L1n_Nak Message is sent, the $L1_N$ target may initiate any TLP or DLLP transfers. Upon receiving the L1n_Nak Message from the $L1_N$ target, the $L1_N$ initiator may cease transmission of L1n_Request DLLPs and transmit an L1n_Request_Closed message, marking the termination of the $L1_N$ request sequence.

If instead the $L1_N$ target is ready to accept the request, scheduling of any TLPs from the transaction layer may be blocked, and the target may wait until it receives a data link layer acknowledgement for the last TLP previously sent. The $L1_N$ target may retransmit a TLP if required by the data link layer rules. Once all TLPs have been acknowledged, the $L1_N$ target sends a L1n_Ack DLLP downstream. The $L1_N$ target sends this DLLP repeatedly with no more than 4 symbol times of idle time between subsequent transmissions of the L1n_Ack DLLP. As above, the transmission of ordered sets may occur.

The $L1_N$ target may continue to transmit the L1n_Ack DLLP until it observes that its receive lanes enter into an electrical idle state. If the $L1_N$ target needs, for any reason, to transmit a TLP on the link after it sends a L1n_Ack DLLP, the transition to $L1_N$ may first be completed, and then an exit from the $L1_N$ state may be initiated to handle the transfer once the link is back to L0.

When the $L1_N$ initiator receives a L1n_Ack DLLP, the $L1_N$ initiator may cease sending the L1n_Request DLLPs, disable DLLP and TLP transmission and bring its transmitter into the electrical idle state. When the $L1_N$ target detects an electrical idle on its receiver, it then ceases to send the L1n_Ack DLLP, disables DLLP, TLP transmission and brings the target direction of the link into the electrical idle state. While in the $L1_N$ state, if there are outstanding requests, a completion timeout mechanism may continue. Periodic flow control updates are not sent during $L1_N$.

Components on either end of a link may initiate an exit from the $L1_N$ link state. For example, a component can initiate an exit from the $L1_N$ state if it needs to communicate through the link, regardless of its flow control state. The component may initiate the transition from the $L1_N$ state to the L0 state in various manners.

Thus in various embodiments, a deterministic time frame may be provided to enable aggressive power management through defining an extended idle window for a link to remain in an idle state. Through this coordinated behavior that can be initiated by either device, a platform can power manage various system resources such as a 100 megahertz (MHz) reference clock, a voltage regulator (VR) or memory subsystem, for example. Further, devices may have more and finer-grained control of entry and exit from idle status, affording greater power management options. Accordingly, a platform can utilize the knowledge of a deterministic idle time window to coordinate between devices and enable more aggressive power management of the platform.

Figure 4:
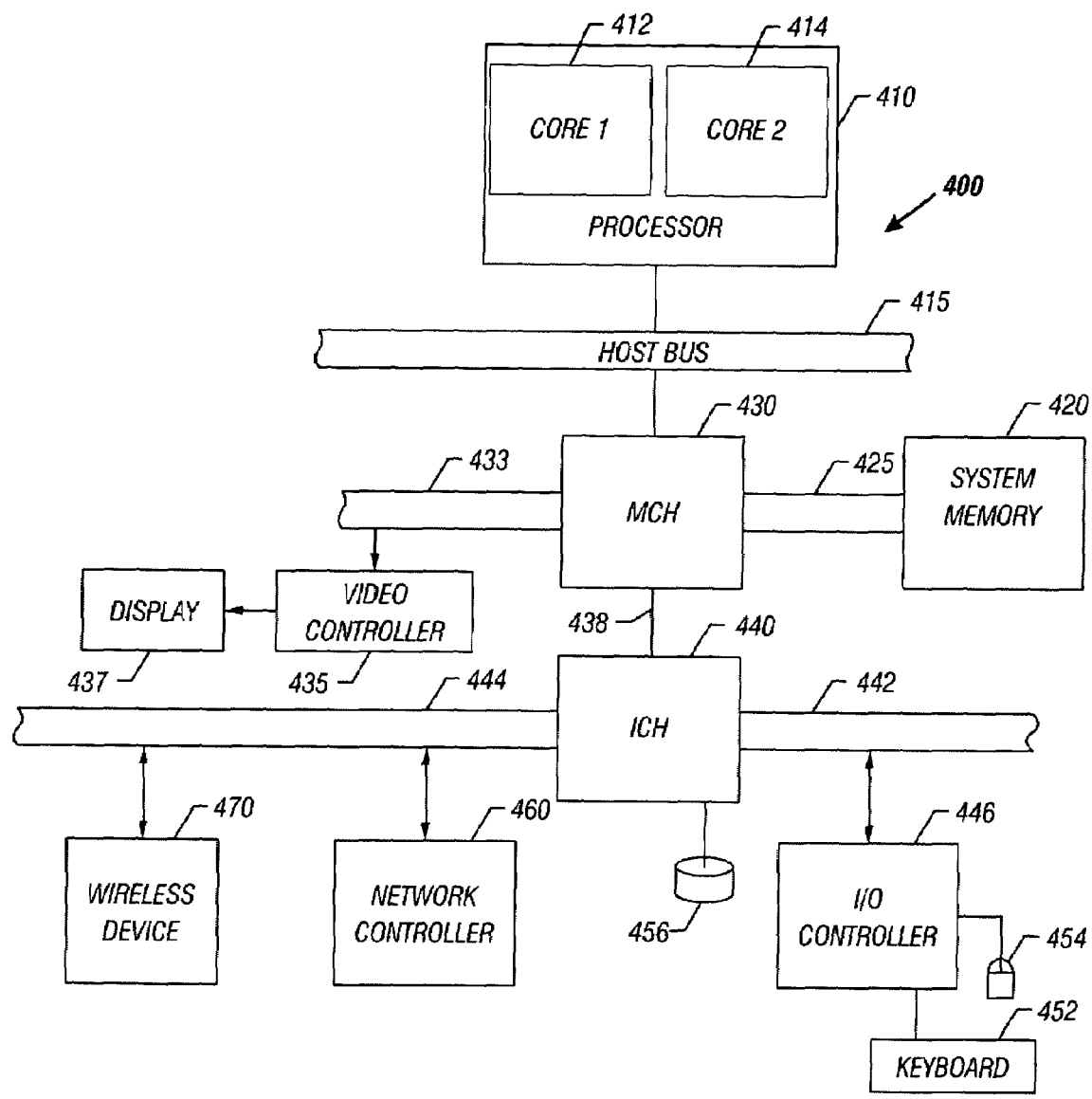
FIG. 4 is a block diagram of a system in which embodiments of the present invention may be used.

FIG. 4 is a block diagram of a computer system 400 in which embodiments of the invention may be used. As used herein, the term "computer system" may refer to any type of processor-based system, such as a notebook computer, a server computer, a laptop computer, a desktop computer or the like. In one embodiment, computer system 400 includes a processor 410, which may be a multicore processor including a first core 412 and a second core 414. Processor 410 may be coupled over a host bus 415 to a memory controller hub (MCH) 430 in one embodiment, which may be coupled to a system memory 420 (e.g., a dynamic random access memory (DRAM)) via a memory bus 425. MCH 430 may also be coupled over a bus 433 to a video controller 435, which may be coupled to a display 437.

MCH 430 may also be coupled (e.g., via a direct media interface or hub link 438) to an input/output (I/O) controller hub (ICH) 440 that is coupled to a first bus 442 and a second bus 444. First bus 442 may be coupled to an I/O controller 446 that controls access to one or more I/O devices. As shown in FIG. 4, these devices may include in one embodiment input devices, such as a keyboard 452 and a mouse 454. ICH 440 may also be coupled to, for example, a hard disk drive 456. It is to be understood that other storage media and components may also be included in the system.

Second bus 444 may also be coupled to various components including, for example, a network controller 460 that is coupled to a network port (not shown). As further shown in FIG. 4, a wireless device 470 may be coupled to second bus 444. Wireless device 470 may include an antenna, such as a dipole antenna and may be adapted to communicate wirelessly between system 400 and a remote device via a desired wireless protocol.

In one embodiment, ICH 440 and wireless device 470, for example, may each be capable of initiating a request for an extended idle state with regard to the link therebetween. For example, ICH 440 may initiate such a request when it is aware of a given state of system 400. For example, based on a temperature warning, a low battery condition or other such emergency state, ICH 440 may initiate a request for an inactive state with regard to its link with wireless device 470. Of course, other components of system 400 may also initiate such a request, e.g., based on their knowledge of an extended idle period. In various embodiments, hardware, software, firmware or combinations thereof may be present in both ICH 440 and wireless device 470 to enable such negotiation activities. Of course, similar such functionality may be present in other components.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving at a target device a request for a deterministic idle time window from an initiator device via an interconnect;
   determining whether to accept the request; and
   acknowledging the request to the initiator device based on the determination, including sending an acknowledgement message indicating an idle time window having a different length than the deterministic idle time window.

2. The method of claim 1, wherein acknowledging the request comprises declining the request if the target device does not have an available idle time window of a length equal or less than the deterministic idle time window.

3. The method of claim 1, further comprising receiving the request via a serial interconnect coupled between the target device and the initiator device, wherein the target device comprises a peripheral device of a mobile system and the initiator device comprises an interface hub of the mobile system.

4. The method of claim 1, further comprising entering a power management mode for an interface of the initiator device upon receipt of the acknowledgment.

5. The method of claim 4, further comprising disabling a phase-locked loop of a platform including the initiator device in the power management mode.

6. The method of claim 1, wherein determining whether to accept the request comprises determining in the target device an anticipated time until a next activity of the target device.

7. The method of claim 6, further comprising accepting the request if the anticipated time is greater than a threshold, the threshold corresponding to a period for entry into and exit from a power management mode for the target device.

8. The method of claim 1, further comprising entering into a power management mode on an interface of the target device based on an electrical state of the interconnect.

9. The method of claim 1, further comprising transmitting a second request for a second deterministic idle time window to the initiator device at a later time, wherein at the later time the target device initiates and transmits the second request to the initiator device.

10. An apparatus comprising:
a first device to transmit a request for a deterministic idle time window to a second device coupled to the first device via an interconnect, wherein the first device is to transmit the request based on a state of the interconnect, and the first device is to enter into a low power state for a second idle time window less than the deterministic idle time window if the second device transmits an acknowledgment for the second idle time window.

11. The apparatus of claim 10, wherein the state of the interconnect corresponds to an inactive status of the interconnect.

12. The apparatus of claim 10, wherein the first device comprises a component of a platform and the second device comprises a peripheral device coupled to the platform, the platform comprising a mobile system.

13. The apparatus of claim 12, wherein the component comprises a hub interface having a first link interface to the interconnect and the peripheral device comprises a wireless adapter having a second link interface to the interconnect.

14. The apparatus of claim 13, wherein the first link interface is to enter a power management mode upon receipt of an acknowledgment to the request from the peripheral device, and wherein the second link interface is to enter a power management mode upon detection of an electrical idle state of the interconnect.

15. The apparatus of claim 10, wherein a platform including the first device is to enter a power management mode in which at least one platform component is disabled when the first device enters the low power state.

16. An article comprising a machine-readable storage medium including instructions that if executed by a machine enable the machine to perform a method comprising:
transmitting a request for an idle time window having a first known length from a system component to a target device coupled to the system component via an interconnect; and
committing at least a portion of the system component to an idle state for a time period corresponding to the first known length or a second known length, the second known length shorter than the first known length.

17. The article of claim 16, wherein the method further comprises committing at least the portion to the idle state for the time period corresponding to the second known length after receiving an acknowledgment from the target device, the acknowledgment for the second known length.

18. The article of claim 17, wherein the method further comprises placing an interface of the system component into a low power state for the time period.

19. The article of claim 16, wherein the method further comprises receiving an acknowledgment from the target device for the first known length.

20. The article of claim 19, wherein the method further comprises placing a reference clock and a phase-locked loop of the machine into a low power state responsive to the acknowledgment.

21. The article of claim 16, wherein the method further comprises transmitting the request from a hub interface of the machine to a wireless adapter coupled to the interconnect.

22. The article of claim 21, wherein the method further comprises receiving from the wireless adapter an acknowledgment for the second known length, wherein the wireless adapter is to perform a predetermined activity before the end of the first known length and after the second known length.

23. The article of claim 16, wherein the method further comprises transmitting the request based on a system operating parameter corresponding to a low battery indication.

24. A system comprising:
a first device;
a second device coupled to the first device via an interconnect, wherein the first device is to transmit a message regarding a negotiation for a deterministic idle period for the interconnect based on a priori knowledge of a system operating parameter corresponding to at least one of battery availability or temperature level; and
a dynamic random access memory (DRAM) coupled to the first device and the second device.

25. The system of claim 24, wherein the system comprises a mobile device, the first device comprises a chipset, and the second device comprises a peripheral device.

26. The system of claim 24, wherein the second device is to respond to the message with an acknowledgment for a second deterministic idle period, the second deterministic idle period less than the deterministic idle period.

* * * * *